(12) United States Patent
Dale et al.

(10) Patent No.: US 8,904,528 B2
(45) Date of Patent: Dec. 2, 2014

(54) METHOD AND APPARATUS FOR TRANSLATION OF BUSINESS MESSAGES

(71) Applicant: Elemica, Inc., Exton, PA (US)

(72) Inventors: Paul Dale, Frankfurt (DE); Blake Schnorf, Atlanta, GA (US); Markus Fix, Frankfurt (DE); Arun Samuga, Atlanta, GA (US)

(73) Assignee: Elemica, Inc., Exton, PA (US)

( * ) Notice: Subject to any disclaimer, the term of this patent is extended or adjusted under 35 U.S.C. 154(b) by 0 days.

(21) Appl. No.: 14/043,076

(22) Filed: Oct. 1, 2013

(65) Prior Publication Data

US 2014/0282970 A1    Sep. 18, 2014

Related U.S. Application Data

(60) Provisional application No. 61/792,388, filed on Mar. 15, 2013, provisional application No. 61/808,430, filed on Apr. 4, 2013.

(51) Int. Cl.
```
G06F 12/14     (2006.01)
H04L 12/58     (2006.01)
H04L 9/32      (2006.01)
H04L 29/06     (2006.01)
```

(52) U.S. Cl.
CPC ............ *H04L 51/04* (2013.01); *H04L 9/3263* (2013.01); *H04L 9/3215* (2013.01); *H04L 63/0823* (2013.01); *H04L 63/08* (2013.01); *H04L 2463/082* (2013.01)
USPC ........................................... 726/22; 709/246

(58) Field of Classification Search
CPC .............. H04L 29/08756; H04L 67/2823; H04L 69/22
USPC ............................................ 709/246; 726/22
See application file for complete search history.

(56) References Cited

U.S. PATENT DOCUMENTS

| | | |
|---|---|---|
| 5,202,977 A | 4/1993 | Pasetes, Jr. et al. |
| 6,726,094 B1 | 4/2004 | Rantze et al. |
| 7,085,286 B2 | 8/2006 | Dias et al. |
| 7,117,215 B1 | 10/2006 | Kanchwalla et al. |

(Continued)

FOREIGN PATENT DOCUMENTS

| | | |
|---|---|---|
| WO | 9838585 A1 | 9/1998 |
| WO | 2004072886 A1 | 8/2004 |
| WO | 2006026659 A2 | 3/2006 |

OTHER PUBLICATIONS

IBM, "B2B Integration special features," posted on the Internet at http://www-01.ibm.com/software/in/commerce/b2b/b2b-integration/products/special-features/ (visited Jul. 2013).

(Continued)

*Primary Examiner* — Harunur Rashid
(74) *Attorney, Agent, or Firm* — Panitch Schwarze Belisario & Nadel LLP

(57) ABSTRACT

A system and method are provided for translation of business messages between trading partners. A routing slip is determined based upon information related to the sender and information related to the recipient of the business message. The business message is processed using business data rationalization in accordance with the routing slip, wherein business data rationalization includes parsing an arbitrary syntax of the business message and applying semantically meaningful names to individual data elements or sets of elements of the business message identified by the arbitrary syntax.

25 Claims, 5 Drawing Sheets

(56) References Cited

U.S. PATENT DOCUMENTS

| | | |
|---|---|---|
| 7,337,148 B2 | 2/2008 | Xie et al. |
| 7,509,431 B2 | 3/2009 | Singhal et al. |
| 7,548,939 B2 | 6/2009 | Kalach et al. |
| 7,562,041 B2 | 7/2009 | Chehade et al. |
| 7,639,629 B2 | 12/2009 | Kumar et al. |
| 7,779,295 B1 | 8/2010 | Shah et al. |
| 7,836,120 B2 | 11/2010 | Zafar |
| 7,925,631 B1 | 4/2011 | Thillai et al. |
| 8,032,552 B2 | 10/2011 | Davies et al. |
| 8,046,441 B2 | 10/2011 | Banerji et al. |
| 8,065,657 B2 | 11/2011 | Deimel et al. |
| 8,145,992 B2 | 3/2012 | Jacquin et al. |
| 8,290,833 B2 | 10/2012 | Yang et al. |
| 8,312,148 B2 | 11/2012 | Anthias et al. |
| 2002/0107699 A1 | 8/2002 | Rivera et al. |
| 2002/0107913 A1* | 8/2002 | Rivera et al. ............ 709/203 |
| 2003/0002526 A1* | 1/2003 | Dias et al. ............... 370/466 |
| 2003/0065623 A1 | 4/2003 | Corneil et al. |
| 2003/0130945 A1 | 7/2003 | Force et al. |
| 2004/0010714 A1 | 1/2004 | Stewart |
| 2004/0153359 A1 | 8/2004 | Ho et al. |
| 2004/0221045 A1* | 11/2004 | Joosten et al. .......... 709/227 |
| 2005/0071283 A1 | 3/2005 | Randle et al. |
| 2006/0059565 A1 | 3/2006 | Green et al. |
| 2006/0155946 A1 | 7/2006 | Ji |
| 2007/0143665 A1 | 6/2007 | Machiraju et al. |
| 2008/0120129 A1* | 5/2008 | Seubert et al. ............ 705/1 |
| 2008/0244088 A1* | 10/2008 | Shorter et al. .......... 709/238 |
| 2010/0211938 A1* | 8/2010 | Singh et al. ............. 717/141 |
| 2010/0269156 A1 | 10/2010 | Hohlfeld et al. |
| 2012/0158875 A1 | 6/2012 | Almeida |
| 2012/0233023 A1* | 9/2012 | Chehade et al. ...... 705/26.41 |
| 2013/0080542 A1* | 3/2013 | Peng et al. ............. 709/206 |
| 2013/0226776 A1* | 8/2013 | Chehade et al. ......... 705/37 |
| 2013/0283106 A1* | 10/2013 | King et al. ............... 714/49 |
| 2014/0068252 A1 | 3/2014 | Maruti et al. |
| 2014/0114825 A1* | 4/2014 | Krikorian et al. ........ 705/34 |

OTHER PUBLICATIONS

IBM Redbooks, "Tracking Payments and Securities with IBM Financial Transaction Manager V2," posted on the Internet at http://www.redbooks.ibm.com/abstracts/tips0963.html (visited Jul. 2013).

Trappey et al, "Building b2b protocols in inter-enterprise process execution," Proceedings of the Fifth Asia Pacific Industrial Engineering and Management Systems Conference, posted on the internet at http://www.apiems.net/archive/apiems2004/pdf/apiems2004_7.3.pdf (2004).

The Oracle Corp., The Java EE 6 Tutorial, vol. 1 (2010).

BEA Systems, "Introducing WebLogic Integration B2B Security," found on the Internet at http://docs.oracle.com/cd/E13214_01/wli/docs70/b2bsecur/intro.htm (visited Jul. 2013).

RSSBus, "As2 Connector—Getting Started," found on the Internet at http://www.rssbus.com/solutions/as2/gettingstarted.aspx (2013).

ACM Digital Library, "Client certificate and IP address based multi-factor authentication for J2EE web applications," Abstract only, found on the Internet at http://dl.acm.org/citation.cfm?id=1321229 (2007).

Williscroft, "Trading Partner Web Certificates," found on the internet at http://www.imc.org/ietf-pkix/old-archive-00/msg01245.html, (Jun. 23, 2000).

Office Action issued Apr. 22, 2014 in U.S. Appl. No. 14/181,139 by Dale.

Int'l Search Report and Written Opinion issued Oct. 17, 2014 in Int'l Application No. PCT/US2014/028904.

* cited by examiner

METHOD AND APPARATUS FOR TRANSLATION OF BUSINESS MESSAGES

CROSS-REFERENCE TO RELATED APPLICATION

This application claims the benefit under 35 U.S.C. §119 (e) of U.S. Provisional Application No. 61/808,430, filed Apr. 4, 2013 and U.S. Provisional Application No. 61/792,388, filed Mar. 15, 2013, the entire disclosure of which is hereby incorporated herein by reference.

BACKGROUND OF THE INVENTION

The present invention relates generally to systems and methods for translation of messages and, more particularly, to debuggable and fixable systems and processes for translating messages between business partners in a supply chain or trading network.

Supply chains involve large numbers of parties, each of whom will generally need to communicate with multiple other parties. Numerous message exchange standards exist to facilitate these supply chain communications, but only certain standards will be supported by the business systems of each party. Mismatches in supported standards may make communications more costly, less efficient, or less accurate, or even lead to an inability to conduct business between the parties.

What is needed is a system and associated methods for efficiently and accurately transmitting messages between trading partners in a trading network without requiring modification to the systems or message exchange formats of the parties.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

DETAILED DESCRIPTION OF THE INVENTION

Figure 1:
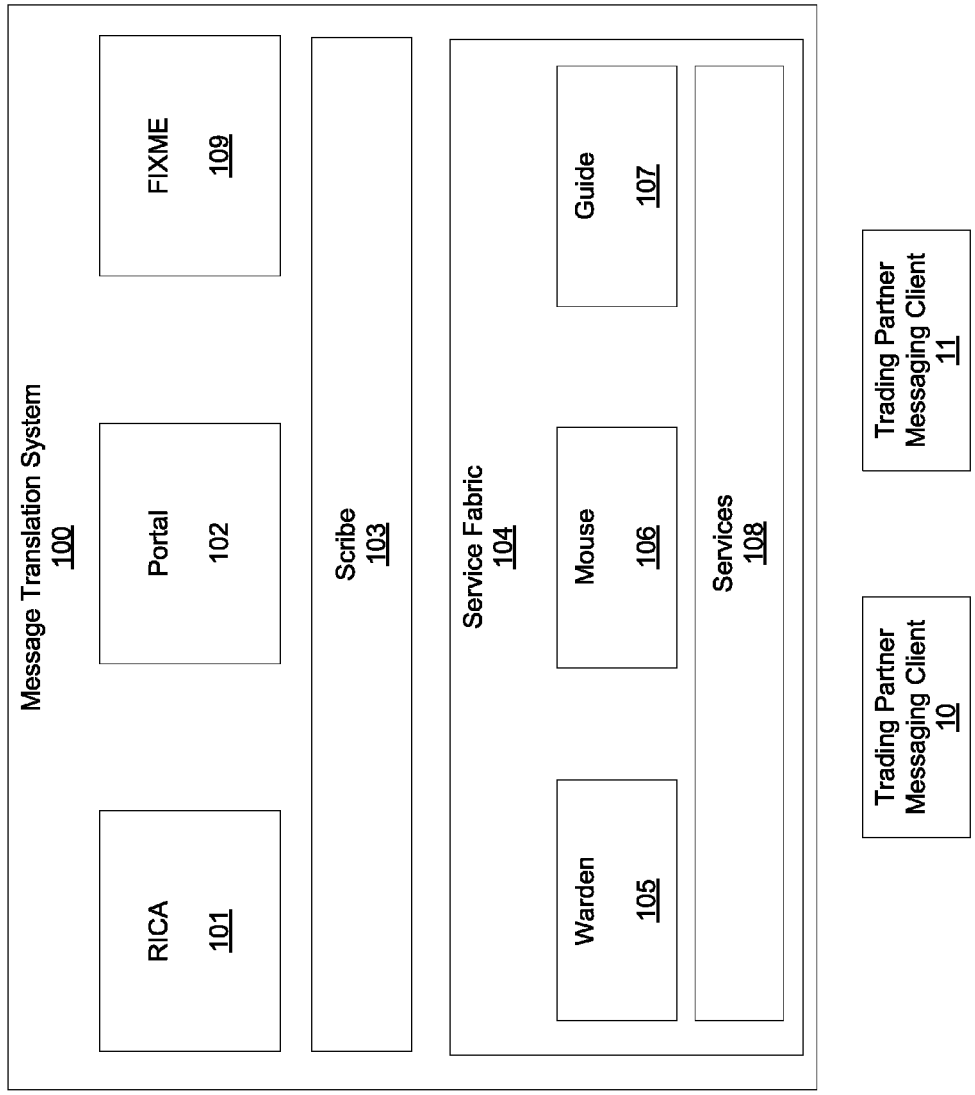
FIG. 1 is an exemplary diagram of a message translation system in accordance with a preferred embodiment of the present invention.

Certain terminology is used in the following description for convenience only and is not limiting. The words "lower," "bottom," "top" and "upper" designate directions in the drawings to which reference is made. The terminology includes the above-listed words, derivatives thereof, and words of similar import. Additionally, the words "a" and "an", as used in the claims and in the corresponding portions of the specification, mean "at least one."

Referring to the drawings in detail, wherein like reference numerals indicate like elements throughout, a preferred message translation system 100 for transmitting messages between network partners is described.

Referring to FIG. 1, message translation system 100 provides for communications between two exemplary trading-partner messaging clients 10 and 11. Messaging clients 10 and 11 may be communications-specific software or message-handling components of other business systems, such as Enterprise Resource Planning (ERP) systems. Message translation system 100 provides, for example, translation of messages from the message exchange format used by messaging client 10 to and from the message exchange format used by messaging client 11.

The message translation system 100 includes an interconnection component, Redundant Interchangeable Connectivity Array (RICA) 101, a user management interface, Portal 102, a data storage and management component, Scribe 103, a message processing system, Service Fabric 104, and an exception handling component, FIXME 109. The Portal 102 preferably includes a management interface for interacting with users at remote locations. RICA 101 provides the interconnection(s) between the network partners and the network for incoming and outgoing data The Scribe 103 is the data storage and management system. The Service Fabric 104 is preferably configured through the Portal 102, gets input from RICA 101, and uses Scribe 103 for data retrieval and storage. The lower levels of the system 100 are created by the Service Fabric 104 and Scribe 103, integrated by RICA 101, and viewed and configured by the Portal 102. Together, the components create a generalized Process-Semantics-Aware High-Performance data store.

Messages may be any data or information stream related to a process, preferably a business process. The translated messages are generally business messages, for instance, purchase orders, acknowledgments, advance shipping notices, delivery receipts, invoices, or any other messages related to the buying, selling, manufacture, distribution, maintenance, and repair of goods, as well as other operations. In a preferred embodiment, types of messages may include, but are not limited to: Application Advice, Booking Confirmation, Booking Response, Booking Request, Certificate of Analysis, Custom Document, Delivery Receipt, Demand Forecast, Email Outbound, Envelope, Financial Information Report, Forecast, Freight Bill, General Purpose, Goods Receipt, Inventory, Inventory Actual Usage, Invoice, Invoice Adjustment, Load Tender Motor, Load Tender Ocean, Load Tender Response, Lockbox, Ocean Schedule, Order Change, Order Create, Order Response, Organization Relationships, Ownership Transfer Report, Payment Details, Planning Schedule, Product Activity Report, Product Data Message, Product Movement Report, Receipt Notice, Receiving Advice, Self Invoice, Ship Notice, Shipment Information, Shipment Instructions, Shipment Status, Shipping Schedule, and Supply Plan.

Messages are generally received in one of many message exchange formats and translated to another message exchange format selected based upon the capabilities of the receiver. Message formats may include, for example, UN/EDIFACT, ANSI X12, CIDX, PIDX, IDOC, xCBL, EBXML, cXML, GUSI, ODETTE, OAGIS, or other XML formats. Messages may be transmitted to and from the message translation system using a variety of methods such as email, FTP/SFTP, HTTP/HTTPS, SOAP, REST, or an API.

Messages may be transmitted completely asynchronously, or a requestor may synchronously wait for a reply, which is created within Service Fabric 104. Other methods for transmitting messages over a network are known to those skilled in the art, and are within the scope of this disclosure.

RICA 101 is a self-service, content-agnostic, multi-protocol messaging broker. RICA 101 decouples the incoming message processing from the protocol used by a networked system to transmit the message. That is, once the message has been received, the method by which it was received is generally no longer considered in its processing. RICA 101 functions as a gateway, offering connections in and out of the message translation system, and comprises an incoming system and an outgoing system.

The incoming system of RICA 101 defines how messages enter the message translation system. Messages enter the system from a networked partner or web/API-enabled partner, are authenticated, and then securely stored before acknowledgement. A two-step authentication process, described further below, is utilized in authenticating the networked partner in order to reduce the friction in troubleshooting connectivity issues for the normally troublesome certificate-based connectivity methods.

The outgoing system of RICA 101 defines how messages destined for recipients leave the message translation system. The outgoing system may receive incoming connections (pull), or it may actively make connections to the receiving client system (push), to deliver messages.

The system has the ability to receive messages via any number of endpoints across a horizontally scalable service. Endpoints are provisioned at run-time. The system may queue messages in an arbitrary number of priority or process-oriented queues. After messages are received via a connected partner they are stored for processing. RICA 101, Scribe 103, and the Portal 102 can be used to assign priority or specific processing characteristics (e.g., "messages from a specific partner must be processed in under 3 minutes").

RICA 101 is preferably an acknowledgment-based system. In operation, a trading partner 10 submits a message to RICA 101, which acknowledges receipt of the message. After RICA 101 receives the message, regardless of the user or protocol type, a process between RICA 101 and Scribe 103 is initiated. RICA 101 transmits an Authorize command to Scribe 103, passing the certificate of the user. Scribe 103 returns a Business Unit result associated with the transmitted certificate. In response, RICA 101 transmits the message to Scribe 103, along with additional information relating to the message. The message is passed from RICA 101 to Scribe 103 by a Put Message command, which is acknowledged to RICA 101 by Scribe 103. Preferably, messages are only acknowledged by RICA 101 to the Networked System after Scribe 103 has acknowledged to RICA 101 so that the system does not accept responsibility for a message until it has been securely persisted. The processed message and a Delivery Book associated with the message are finally returned from Scribe 103 to RICA 101.

Portal 102 includes a user interface accessible to users of the message translation system over a network, such as the Internet or other Wide Area Network. Portal 102 stores and manages data in the Scribe 103 system, and manages configuration information used by RICA 101 and the Service Fabric 104. Generally the message translation system is accessible through a Portal 102 available to service providers (e.g., logistics) and the customer.

Portal 102 includes options for Master Data, configuration, administration, and maintenance of the system, such as provisioning, debug, and enablement of connections. The Master Data area contains relevant business information, including contact information and other relevant details related to business, payments, networks, and processing. The configuration area includes connectivity details for RICA 101 and data enhancement/transformation information for the Service Fabric 104, including how messages are passed in and out of the system. The administration area includes details about the client, as well as related business units, connections with partners, network management, and other details. Maintenance functions include the ability to observe the use of communications, the health of the system, and metrics, such as which messages, and how many messages have been processed by the message translation system.

The system may also contain components for operations, management, and maintenance, of the various components and their connection and use. In a preferred embodiment, an Operations module manages and maintains the systems and their operation. This includes oversight for development of the system, technical support, documentation of systems and process, system administration, and other details related to regular operation and metrics. A supervisor process may also preferably be implemented to monitor the proper functioning of one or more of the other components.

The Service Fabric 104 picks up messages coming in to the system from RICA 101. The Service Fabric 104 acts as the integration platform for the message translation system. It handles message processing, transformation, validation, and other value added services. The Service Fabric 104 does the work of the network by facilitating communication of messages in, through, and out of the system. The Service Fabric 104 uses Scribe 103 for persistent data storage and retrieval. Configuration is retrieved via Scribe 103 and managed via the Portal 102. Results and metrics may be observed via the Portal 102.

In a preferred embodiment, the Service Fabric 104 includes (1) actors in a framework including a "Warden" 105, a "Mouse" 106, and a "Guide" 107, and (2) a set of services 108. The Warden 105 is preferably a supervisor process that monitors the system 100 for receipt of new messages, and upon receipt of new messages calls or creates a Mouse 106. The Warden 105 may create numerous Mice 106 for completing operations in accordance with the preferred system 100. If unprocessed messages are found, a Mouse 106 is created for each unprocessed message. The Mouse 106 is preferably a worker process or a supervisor process that receives or requests a service from the Guide 107. The Guide 107 is preferably a service for the worker process or the Mouse 106. Service Fabric 104 is preferably implemented in a multi-paradigm programming language, such as SCALA.

Service Fabric 104 may perform steps of: de-queuing messages from an arbitrary number of message queues, storing messages in their initial state, extracting Concepts from Messages, recognizing messages via extractions, routing messages via recognition output, and, optionally, based on the route, performing: custom extractions, Canonical transformation, data enrichment, database lookups, master-data validation and cross-referencing, content-based validations, business rules and alerting, reporting and analytics, populating messages through reversal of extraction, delivering messages to arbitrary number of endpoints, and relating messages via a correlation service.

Each message received by RICA 101 is processed by an independent mouse 106, which retrieves a Routing Slip that specifies Services 108 in a "route" to analyze, modify, validate, or deliver the message. These routes can be combined to enable a high level of flexibility and customizability. The process begins by obtaining configurations for the sender, receiver, and message type. If the configurations are found, a routing slip heuristic is applied, and an unambiguous match is searched for. If an unambiguous match is found, the routing slip is returned. If the configurations are not found, or no unambiguous match is found, troubleshooting is initiated to address the problem.

Figure 2:
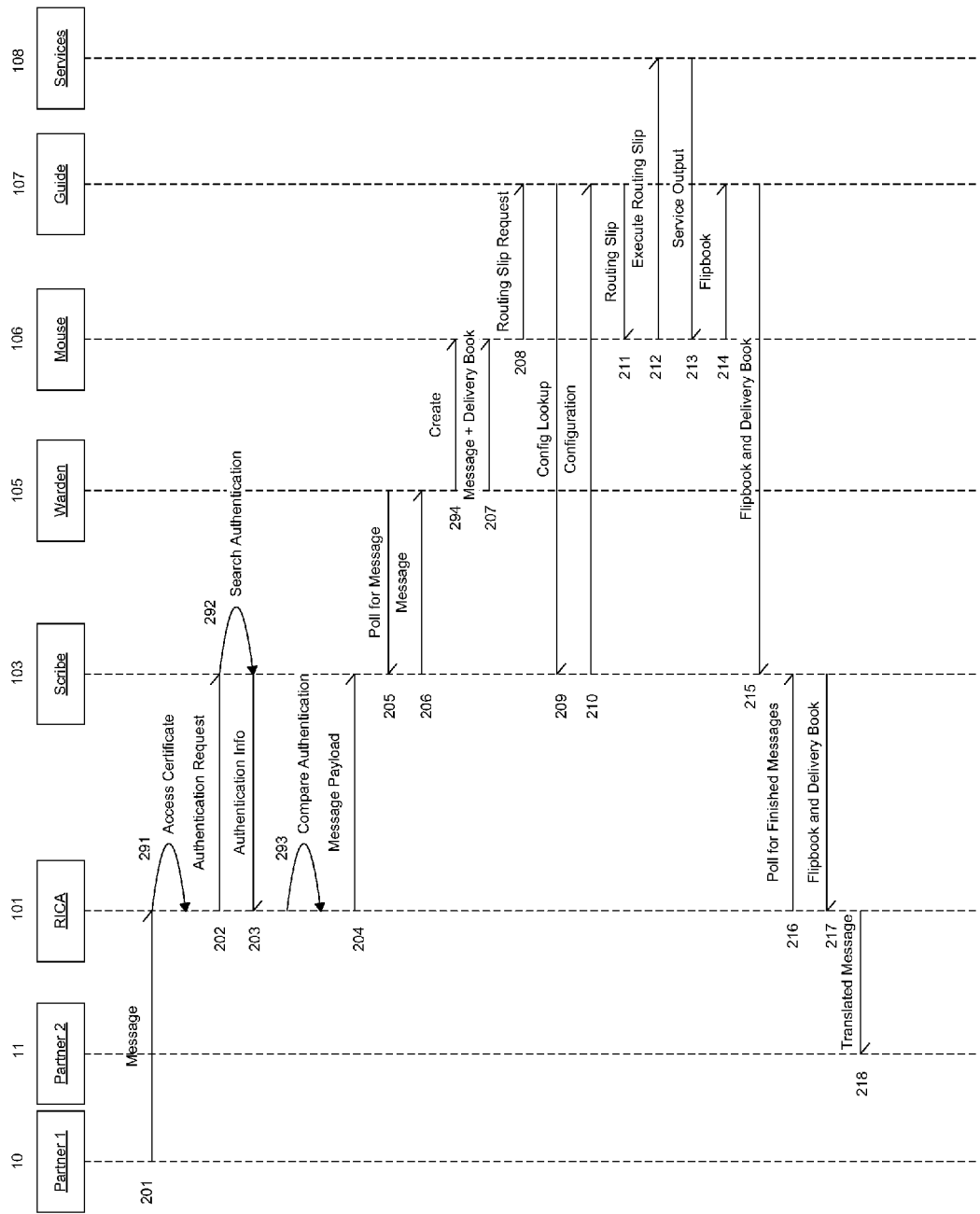
FIG. 2 is an exemplary sequence diagram of receipt, translation, and delivery of a message by the message translation system of FIG. 1.

FIG. 2 is a sequence diagram of an example of message translation by message translation system 100. In a preferred embodiment, at 201, an electronic message is directed from a sending trading partner 10 to RICA 101. At 291, RICA 101 accesses client certificate, when using hypertext transfer protocol secure ("HTTPS") formats, or login and password, when using virtual private network ("VPN"), and identifies a resource identifier, preferably a uniform resource indicator ("URI"), contained within the request.

At 202, RICA 101 requests authentication of the certificate or login/password and URI from Scribe 103. Scribe 103 searches for the authentication in its storage based on the configurations stored from the Portal 102 at 292. Scribe 103 sends authentication information to RICA 101 at 203.

At 293, RICA 101 compares the authentication information from Scribe 103 to the stored information, which was received in the initial direction of the message from the trading partner 10 to RICA 101, at 201. If authenticated or the information is confirmed, RICA 101 accepts the payload of the message itself into the system 100, stores the message as a new message in Scribe 103 and creates a delivery book that includes information about the trading partner 10, at 204.

The full message is preferably not allowed into the system 10 until the initial authorization is completed and confirmed. Accordingly, messages from unknown individuals or organizations are not received and/or stored in the system 10 until the identity of the trading partner 10 is confirmed or authorized. If the trading partner 10 is not authenticated, the payload or message is rejected and an error is sent to the exception-handling FIXME component 109.

At 205, Warden 105 is preferably configured to repeatedly poll Scribe 103 for new messages in need of processing. If a new message is found and the Scribe 103 notifies the Warden 105, at 206. The Warden 105 then creates a Mouse 106 and pulls the message and delivery book, at 206, and sends the message and the delivery book to the mouse 106, at 207, for processing of the message and delivery book by the Mouse 106 in the Service Fabric 104. The Mouse 106 requests a routing slip at 208 from the Guide 107 and creates a flipbook, which includes the delivery book. The Guide 107 sends a request, at 209 to the Scribe 103 for the configuration of the message based on the contents of the flipbook. The Scribe 103 sends the configuration to Guide 107 at 210. If no configuration is present or pre-existing, then the flipbook is sent to the error-handling FIXME process 109.

The Guide 107 then sends a routing slip that is based on the configuration received to the Mouse 106 at 211. The Mouse 106 appends the flipbook based on the process. The Mouse 106 executes the routing slip based on the Services 108 contained in the routing slip at 212. At 213, the Mouse 106 saves output from each service 108 to the flipbook. Once the routing slip and its indicated tasks are completed, the mouse 106 sends the flipbook to the Guide 107 and requests a new routing slip, at 214. The Guide 107 looks up the configuration to determine if additional Services 108 are needed. If additional services 108 are needed, the Guide 107 then sends a new routing slip to the mouse 106 at 211 and the mouse 106 executes the routing slip at 212. Once no routing slip is needed, the Guide 107 sends the flipbook and delivery book to the Scribe 103 detailing the receiver of the processed message at 215.

RICA 101 polls the Scribe 103 for any finished messages, as is represented by arrow 216. If a new message is found, RICA 101 pulls the flipbook and delivery book from Scribe 103 at 217. RICA 101 then sends the translated message contained in the flipbook to the receiving trading partner 11 based on the instructions contained in the delivery book at 218. If an error occurs, then the flipbook is sent to the FIXME 109.

Partners connecting to the message translation system are assigned a unique endpoint for message delivery. These endpoints can be provisioned dynamically at run-time and will enable loading and associating authentication information to an endpoint without having to restart or redeploy the message translation system. This allows more directed testing and analysis when there are issues connecting to the message translation system.

Partners have the ability to associate client certificates or username/password authentications with their endpoints. Certificates will be stored via Scribe may be 103 and associated by the authenticated user. Optionally, certificates generated for users that do not have the requisite knowledge. While authentication is generally discussed below with respect to certificates, it is to be understood that any other combination of uniquely identifying characteristics may be used, such as, for instance, a combination of IP address and recipient address.

As described above, a two-step authentication process is utilized in authenticating the Networked Partner in order to reduce the friction in troubleshooting connectivity issues associated with certificate-based connectivity methods. The message translation system may use information regarding authentication failures to assist in this troubleshooting. The two-step authentication is described briefly with respect to FIG. 3, then in detail with respect to FIG. 4.

Figure 3:
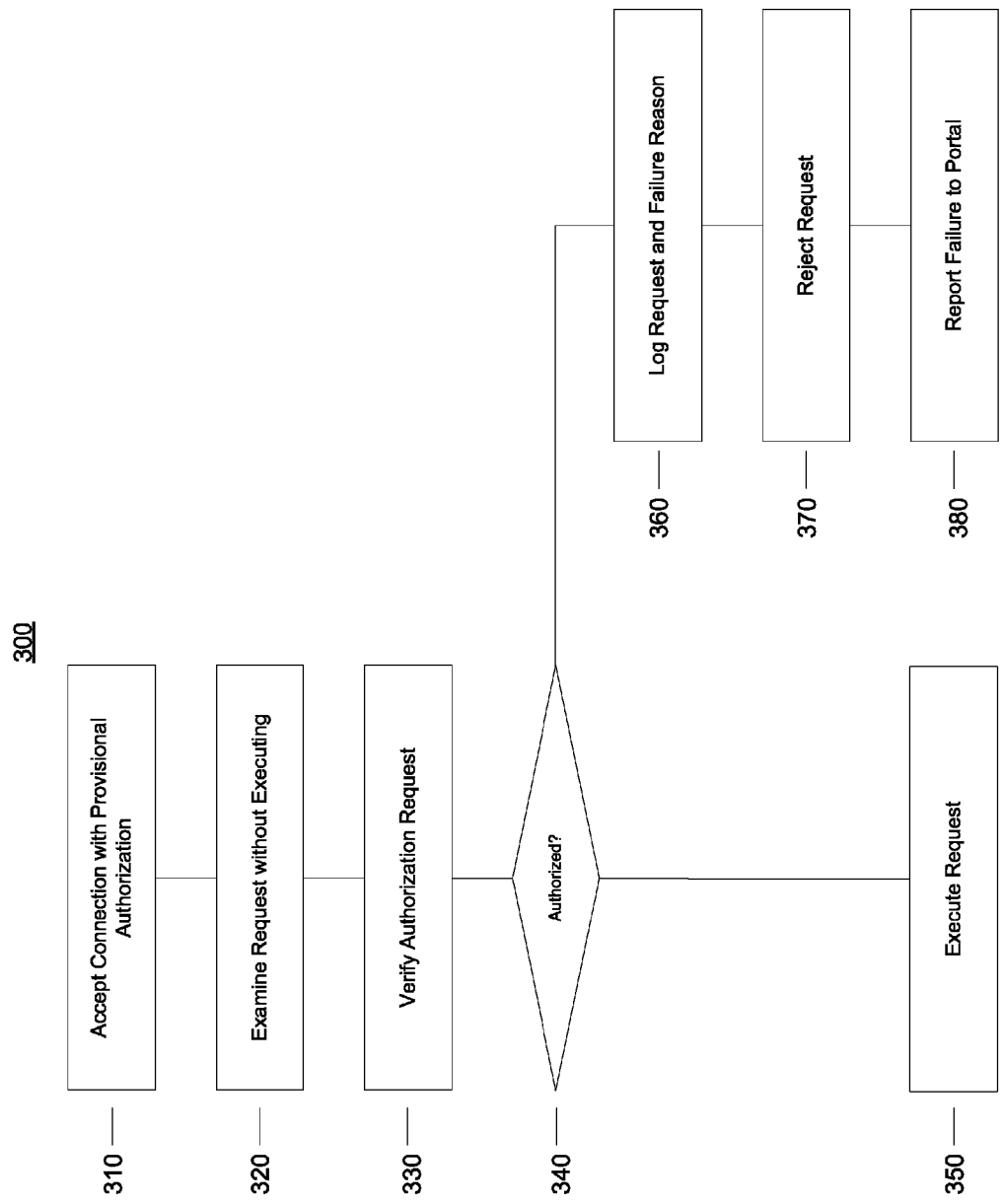
FIG. 3 is an exemplary flow chart of a two-step authorization method of the message translation system of FIG. 1.

FIG. 3 is a flow chart of a two-step authentication process 300. At 310, a connection from a trading partner is accepted with provisional authorization. The client certificate is used to establish a secure tunnel regardless of whether the certificate is known to the message translation system. At 320, the request is examined without being executed. In particular, the resource identifier associated with the request, preferably a URI, is determined. At 330, to verify the request, the user associated with the determined URI is identified. The certificate used for the request is then compared to the certificate for the user associated with the URI to determine whether the request is authorized. If, at 340, a match is confirmed, the request is executed at 350. If the certificates do not match, troubleshooting steps are performed. For instance, at 360, the request and the reason for failure are logged. At 370, the request is rejected. At 380, the failure is reported to Portal 102 for viewing by the user or a system operator. It is to be understood that the troubleshooting steps may vary based upon the reason for the failure, such as the specific details of the certificate that did not match.

Figure 4:
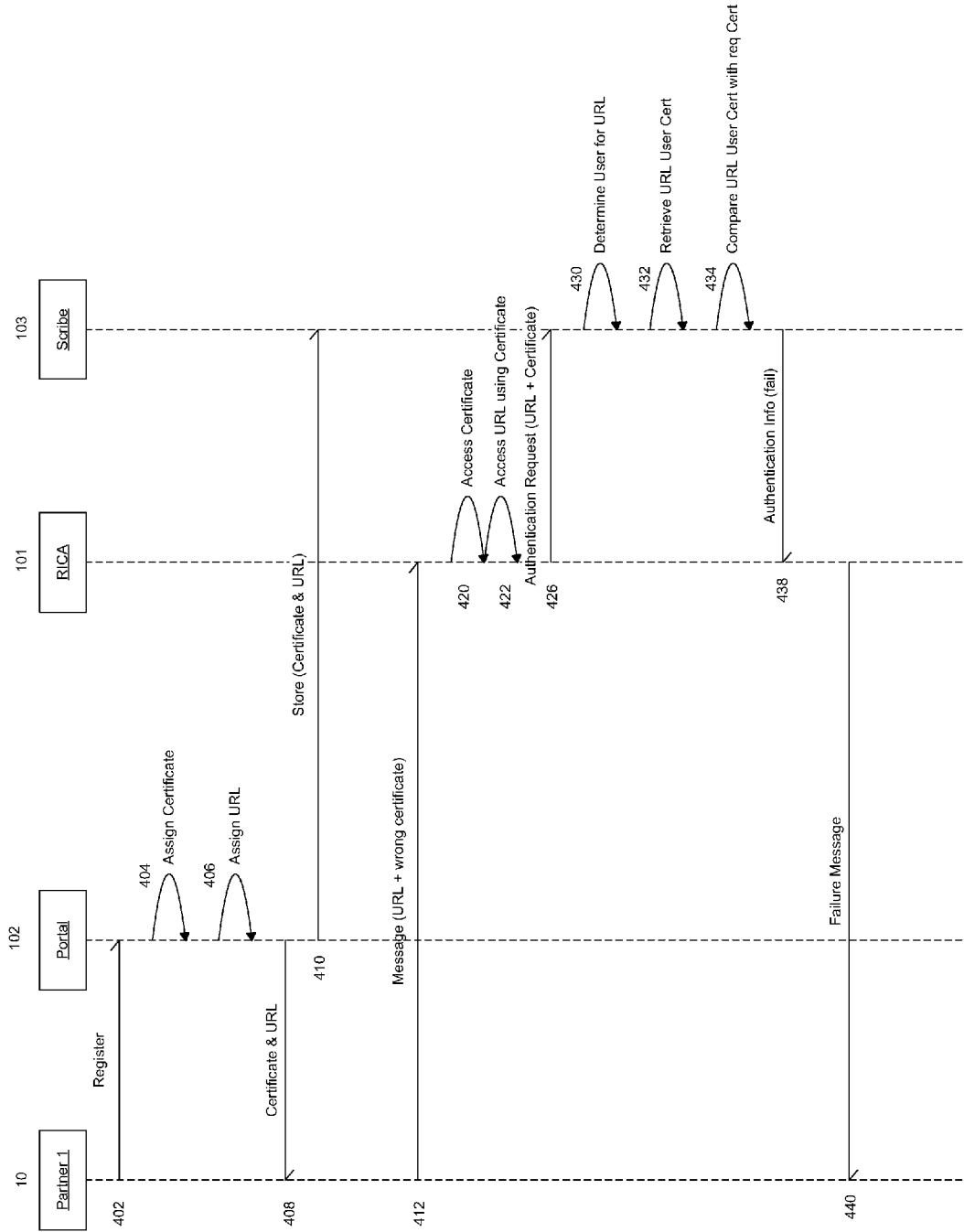
FIG. 4 is an exemplary sequence diagram of a two-step authentication in the message translation system of FIG. 1.

FIG. 4 is a sequence diagram of an example of system operation using certificates using an example of failed authentication. In the following example, it is to be understood that steps are shown to be associated with a particular component of the message translation system 100 for clarity, but may be performed by other components within the scope of the invention.

In a preferred embodiment, each valid user or group of users of the message translation system preforms a registration process 402, either indirectly or via Portal 102. At the time the user account is established, the user is preferably assigned a credential such as an encryption key or certificate at 404. The certificate is preferably an SSL or TLS client certificate. The user is also preferably assigned a unique resource identifier or address for accessing the system, such as a unique URI or root URI, at 406. The credential and resource identifier, preferably a certificate and URI, are provided to Partner 10 at 408. The certificate, or the public key from the certificate, and URI are also provided to Scribe 103 for storage for later use in authentication. In some cases, the Partner may provide its own certificate for use with the system.

At 412, Partner 10 attempts to connect to send a message. In this example, Partner 10 presents an incorrect certificate along with the correct assigned URI for the account encrypted within the request. The connection attempt of 412 may comprise a number of exchanges and may follow the general steps of, for instance, a client-authenticated TLS connection handshake process. The certificate may be in X.509 form and contain a public key for the client.

RICA 101 accesses the received credential at 420 to establish an SSL tunnel and access the URI within the request at 422. RICA 101 may use the certificate presented with the request without regard to whether it is valid for the system, using it merely to establish the tunnel and gain access to the URI associated with the request. In other embodiments, RICA 101 may require that the certificate at least be associated with the message translation system to perform any action.

At 426, RICA passes the URI and certificate to Scribe 103. Scribe 103 then identifies a user associated with the URI at 430. Scribe 103 retrieves the stored certificate associated with the identified user at 432 and compares the stored certificate associated with the user with the received certificate at 434. Through the comparison of certificates, the message translation system determines whether the received certificate is valid for the user associated with the requested URI. If the credential is not valid for the identified user associated with the URI, the system denies access to resources associated with the resource identifier, thereby causing the associated message to be refused. Scribe 103 then sends an indication of the failed authentication to RICA 101 at 438.

The presence of the valid resource identifier inside the request, however, may be an indication that an otherwise valid user is simply using the wrong credential. Thus, the RICA 101 may initiate troubleshooting and, for instance, at 440, communicate information to the user associated with the requested URI via a previously stored contact address to convey the fact that the received credential is not valid for the user associated with the resource identifier in the request. The user may then attempt the request again using the correct credential, or perhaps indicate that the connection request did not originate with that user.

Figure 5:
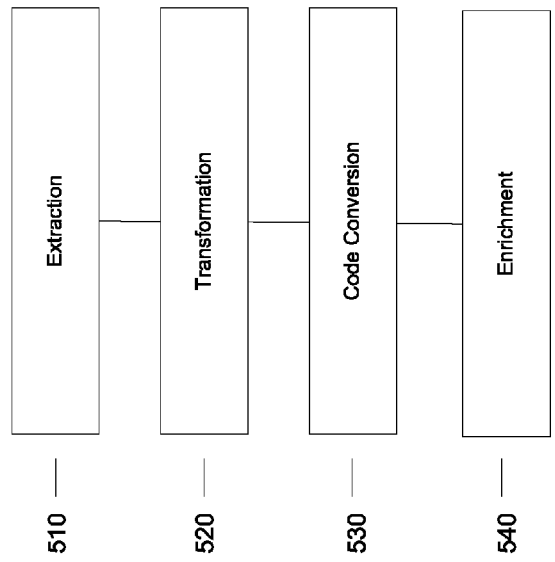
FIG. 5 is an exemplary flowchart of business data rationalization of the message translation system of FIG. 1.

FIG. 5 is a flow chart of a process 500 of Business Data Rationalization. Business Data Rationalization occurs in four steps, the first two steps, Extraction 510 and Transformation 520, modify the structure of the message, while the last two steps, Code Conversion 530 and Enrichment 540, deal with the content of a Business Message.

At 510, Extraction is performed. During the extraction phase the source data is converted from its native format into a data format understood by the system. This early representation of the message is still in the 'shape' of the inbound message, but the data elements have begun to be named.

At 520, Transformation is performed. Transformation allows changing the structure or shape of a message, as well as to change the 'extracted names' to 'canonical names' of Business Concepts. Business Concepts are descriptors relating to a transaction. They are preferably semantically meaningful names such as "Purchase Order Number" and "Delivery Date." Business concepts are the standard communication method for all services and applications of the message translation system. After data is decoupled from standard-based formatting all services can use the set of business concepts to determine how to operate on a message.

The semantically meaningful names may be further transformed into "universal business concepts." Universal business concepts are business concepts that allow association of additional parameters. Examples of universal business concepts include Reference, Date, Partner, Pricing, Contact, Quantity, Currency, Location, Instructions, Payment Terms, Transport Details, Packaging, Identifier, Equipment Details, Purchase Order Type, Unit Of Measure, Country, Language Code, Product Information, and Transport Mode. The semantically meaningful name "buyer," for instance, may be transformed into the universal business concept "Partner (buyer)," where "buyer" is a parameter clarifying the type of "Partner." Services such as validation, business rules, applications, correlation, alerting, notification, extraction, code conversion, enrichment, master data validation and cross-referencing, reporting, dashboard, error handling and support, message routing and orchestration, and data enrichment may be performed on the universal business concepts.

At 530, Code Conversion is performed. Most business messages use codified values to represent commonly used data elements. Units of measure are typically chosen from an existing industry-standard set (e.g., UNEDIFACT Rec. 20, or ANSI X12 355). Code conversions are both standard and configurable, as typically a partner will support only a subset of a particular code list. The values found in the message are converted to those supported in the Canonical message.

At 540, if the message does not have the information necessary to satisfy the Services 108 of the routing slip, data enrichment is used to fill in the missing pieces. In order for all message transformations to be reversible, the side or portion of the message with a missing element is assigned a "virtual" or "remainder" element, which corresponds to the missing element. At runtime, the preferred system 100 uses a configuration to supply this information or initiates a fix or repair process by sending the message to the FIXME 109. This process is meant to be exemplary and not limiting and the system 100 may otherwise or alternatively address a message that has missing sides or portions, such as by requesting additional information from the trading partner 10 who sent the message, searching for appropriate information that may otherwise be available for access by the system 100 or otherwise similarly addressing the missing information.

The enrichment step causes the remaining actions to be taken that are required for a message to fit the Canonical form. This may include, for example, the conversion of a date format, or the addition of leading zeros. Sometimes, not all the required canonical data elements are included in an inbound message. The Enrichment step 540 may therefore provide the ability to "hard-code" values or programmatically insert calculated or inferred values. This step can also be used to add Business Data to the message, based on how it is configured in the system. For example, a location identifier can be used to load an address into the message, or a product ID may be used to load its product identifier.

Rationalization 500 is preferably configurable by partner and by message. These Rationalizations (e.g., extractors or Populators) are stored as configuration information and are searchable, reusable, reversible and reportable. Storing this information as a configuration allows creation of a learning system that will leverage existing data to simplify future Business Message Transformation. The gap between two connected partners can be analyzed, or the required data elements for a new partner connecting to an existing partner may be explicitly stated. Furthermore, specific sets of concept requirements may be defined by business processes, or applications that can be used at design time. Rationalization may also handle message formatting, code-lists, and other requirements specific to the origin/destination message.

The Rationalization 500 is also preferably reversible. That is, once a message has been transformed through the Rationalization process through the fabric 104, not only is the configuration process that the message has gone through stored, preferably so that it can be repeated, but the configuration can also be used by the Services 108 in reverse order to transform a message to its original format. The system 100 is preferably able to use a configuration in its native sequence, and in a reverse sequence, such as the mouse 106 executing the routing slips (arrow 212) and the mouse 106 saving the output (arrow 213), which helps to eliminate a significant amount of duplicated effort when working with an existing message set. Directionality of the message (inbound or outbound) is generally not a factor, as would be apparent to one having ordinary skill in the art based on a review of the present disclosure.

Business Concept requirements and validations can be managed at the edges of the system, but communicated through the processing layer. This will allow a user to decide which standards they will support at design-time, or to quickly analyze the impact of a new partner on boarding.

After the four phases of rationalization of process 500 are completed, the Canonical message is achieved. The Canonical is the message translation system's internal format of a Business Message, on which applications, and reporting and analysis services are built. The Canonical is flexible at a content level, and not limited as to what data it can contain. However, requirements are defined based on partner or process that can be enforced dynamically to ensure proper communication.

During on-boarding of each new trading partner, a reusable mapping, or configuration, for translation of messages from the trading partner message exchange format to the Canonical format may be created. Creating such mappings, however, may be time-consuming and costly. In some embodiments, therefore, the capability may be provided to accept messages without prior development of a mapping for a particular trading partner. Fields from incoming messages with known or determinable meanings may be mapped to business concepts on-the-fly. EDI messages, for instance, may be particularly amendable to being ingested without a specific trading partner onboarding process due to their known, predictable format. In some cases, only a subset of the fields of a message with known meanings may be mapped. If the fields that can be mapped are sufficient for conveying key aspects of a message, such as key terms of a purchase order, interaction with the trading partner may continue without the need for onboarding.

The Canonical may preferably be represented in the form of an XML file on disk. However, in some embodiments, operational efficiency may be achieved by bypassing the steps of writing an XML file to storage and reading it for subsequent delivery. Instead, the intermediate format may be held in-memory.

As the volume of message handling increases over time, it becomes increasingly difficult to know what the system was doing exactly during normal operation, and especially when an error occurs. Therefore, the message translation system is designed to provide knowledge regarding the operation of the system while it is running. Data structures, such as the flipbook, that are self-documenting and immutable are used to record all actions. They cannot be changed once they are created.

Using a flipbook like data structure, all actions initiated regarding an incoming message are recorded on a separate page of the flipbook. Each page of a particular flipbook represents a state change during message processing of that message. As a result, when processing for a specific message fails, it is always clear what happened and where the processing stopped or failed so that corrective actions may be taken.

Authorized users are provided the ability to fix problems while the full context of a failure is still known. The FIXME process 109 implements a path to resolve normal system issues that are due to configuration errors. This makes sure that most errors that can occur will be quickly detected and fixed. All failed messages and their flipbooks are registered with the FIXME 109. An authorized user can then inspect a flipbook in order to decide how to resolve an issue. If the failure is due to an erroneous configuration, the user can change this configuration while the system is running. Preferably, the new configurations can then be tested on the failed message in simulation mode without side effect. Once the erroneous setup has been fixed the original message can be reprocessed using the new configuration.

By eliminating the need to do data preparation and processing, the preferred system 100 enables rapid development of messaging applications to support, automate, or optimize any sort of process. While in the preferred embodiment, the message translation system 100 is applied to automating and optimizing Supply Chain communications, it may similarly be used in a variety of other applications requiring automating and integrating the exchange of information, such as in the medical and regulatory fields.

As would be understood by one skilled in the art, the message translation system may be implemented using a variety of hardware configurations. A single computer may provide all functions, or functions may be allocated amongst multiple machines, physical or virtual. For instance, data storage may be allocated to a specific machine or group of machines running database software. Portal 102 may utilize one or more separate web servers or load balancers. Each computer in the system may comprise a process for executed stored program code for performing the processes and methods described herein. Each computer may also comprise one or more network interfaces for communicating information as described. Each computer may also comprise one or more memories and storage devices for storing program code and data.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the present disclosure.

We claim:
1. A method of sending a business message between a sender and a recipient through a message translation system comprising a processor for executing program code, a memory for storing program code and data, and a network interface for sending and receiving data, comprising:
   determining, by the processor of the message translation system, whether an unambiguous configuration match for the business message is available based upon information regarding the message type of the business mes- sage, information related to the sender of the business message, and information related to the recipient of the business message;

responsive to a determination that an unambiguous configuration match is not available:

processing the business message, by the processor of the message translation system, wherein processing the business message includes:

parsing arbitrary syntax of the business message and associating names of business concepts to a subset of the individual data elements or sets of elements of the business message; and determining a routing slip based upon at least one of: information regarding the message type of the business message, information related to the sender of the business message, and information related to the recipient of the business message, wherein the routing slip comprises information regarding services to be performed on data from the message, wherein the services to be performed on data from the message are determined based upon both a message-processing configuration associated with the sender and a message-processing configuration associated with the recipient, and wherein the determining a routing slip based upon information related to the sender and information related to the recipient comprises retrieving a routing slip associated with the combination of sender and recipient from a memory;

determining a set of names of business concepts required for conveying the business message based at least upon information regarding the message type of the business message;

comparing the determined set of names of business concepts required for conveying the business message with the names of business concepts associated with the subset of the individual data elements or sets of elements of the business message; and responsive to a determination that the names of business concepts associated with the subset of the individual data elements or sets of elements of the business message comprise the determined set of names of business concepts required for conveying the business message, transmitting, by the network interface of the message translation system, the processed business message to an address associated with the recipient.

2. The method of claim 1, wherein names of business concepts are descriptors relating to a business transaction.

3. The method of claim 1, wherein the business message represents one of a purchase order, a purchase order acknowledgment, an advance shipping notice, or an invoice.

4. The method of claim 1 wherein processing the business message further comprises:

receiving the business message at the message translation system in a first message exchange format; and parsing the received business message according to the syntax rules of the first message exchange format;

wherein associating names of business concepts to a subset of the individual data elements or sets of elements of the business message comprises assigning a business concept to a predetermined set of fields within the business message.

5. The method of claim 4, wherein the first message exchange format is one of UN/EDIFACT, ANSI X12, CIDX, PIDX, IDOC, xCBL, EBXML, cXML, GUSI, ODETTE, or OAGIS.

6. The method of claim 4, wherein processing the business message further comprises:

identifying the message exchange format, wherein the message exchange format is an XML-based format; and associating a name of a business concept to each field within the business message in accordance with a schema associated with the identified message exchange format.

7. The method of claim 1, wherein processing the business message further comprises:

receiving the business message at the message translation system as a custom message with an arbitrarily defined structure;

processing the received message according to the arbitrarily defined structure; and associating a name of a business concept to each field of a subset of fields of the arbitrarily defined structure.

8. The method of claim 1 wherein processing the business message further comprises:

transforming each of the associated names of business concepts into a universal business concept.

9. The method of claim 8, wherein one of the associated names of business concepts is "buyer" and the name "buyer" is transformed into the universal business concept "Partner (buyer)."

10. The method of claim 8, comprising the further step of: providing services, using the message translation system, that operate on the universal business concepts.

11. The method of claim 10, wherein providing services includes providing at least two of validation, application of business rules, processing of message data by an application, correlation, alerting, notification, extraction of data, code conversion, master data validation, cross-referencing, reporting, population of a dashboard interface, error handling, support, message routing, and data enrichment.

12. The method of claim 11, wherein validation comprises:

reviewing a character size of a purchase order number associated with the business message to ensure a character size of the purchase order number is equal to a predetermined number of characters stored in the message translation system.

13. The method of claim 12, wherein the predetermined number of characters is received at the message translation system separately from the business message.

14. The method of claim 1 further comprising:

after processing the message in accordance with the routing slip, determining a second routing slip comprising information regarding additional services to be performed on data from the message.

15. The method of claim 1 further comprising:

responsive to a determination that the message lacks information required to perform a service specified in the routing slip, determining information to perform the service.

16. The method of claim 1 further comprising:

detecting that the message is missing data; and inserting appropriate information into the message.

17. The method of claim 1 further comprising:

using first information from a credential associated with the request to send a message to determine a resource identifier associated with the request;

identifying a sender associated with the determined resource identifier; and authenticating the identified sender using second information from the credential associated with the request to send a message.

18. The method of claim 17 wherein the credential comprises one of a certificate, a key, or a password.

19. The method of claim 17 further comprising:
responsive to successfully authenticating the sender using the credential, sending an acknowledgment to an address associated with the sender.

20. The method of claim 1 wherein the processing the message comprises:
storing at least one of: information regarding each state change of the message, or, information regarding each action performed on data from the message.

21. The method of claim 1 further comprising:
determining a type of the message; and
determining the routing slip based also upon information related to the type of the message.

22. The method of claim 1 further comprising associating a message-processing configuration with a sender or recipient.

23. The method of claim 1 further comprising:
provisioning an endpoint associated with the sender; and
associating a resource identifier with the sender.

24. The method of claim 1 wherein the routing slip comprises information regarding processing steps or services to be performed on the business message.

25. A method of sending a business message between a sender and a recipient through a message translation system including a processor for executing program code, a memory for storing program code and data, and an interface for sending and receiving data, the method comprising:
determining, by the processor of the message translation system, whether an unambiguous configuration match for the business message is available based upon at least one of: information regarding the message type of the business message, information related to the sender of the business message, and information related to the recipient of the business message;
responsive to a determination that an unambiguous configuration match is not available:
determining, by the processor of the message translation system, a routing slip, based upon at least one of: information related to the sender, information related to the recipient, and information related to the business message, wherein the routing slip comprises information regarding services to be performed on data from the message, wherein the services to be performed on data from the message are determined based upon both a message-processing configuration associated with the sender and a message-processing configuration associated with the recipient, and wherein the determining a routing slip based upon information related to the sender and information related to the recipient comprises retrieving a routing slip associated with the combination of sender and recipient from a memory;
processing the business message, by the processor of the message translation system, in accordance with the determined routing slip, wherein processing the business message includes parsing arbitrary syntax of the business message and associating names of business concepts to individual data elements or sets of elements of the business message identified by the arbitrary syntax and determined to be required for processing the business message in accordance with the routing slip;
determining a set of names of business concepts required for conveying the business message based at least upon information regarding the message type of the business message;
comparing the determined set of names of business concepts required for conveying the business message with the names of business concepts associated with the subset of the individual data elements or sets of elements of the business message; and
responsive to a determination that the names of business concepts associated with the individual data elements or sets of elements of the business message comprise the determined set of names of business concepts required for conveying the business the message, transmitting, by the network interface of the message translation system, the processed business message to an address associated with the recipient, wherein the routing slip comprises information regarding processing steps to be performed on the business message.

* * * * *